June 1, 1965  F. J. CARSON ETAL  3,186,821
APPARATUS FOR BENDING GLASS SHEETS
Filed June 12, 1961  4 Sheets-Sheet 1

INVENTORS
Frank J. Carson and
BY Herbert A. Leflet, Jr.

ATTORNEYS

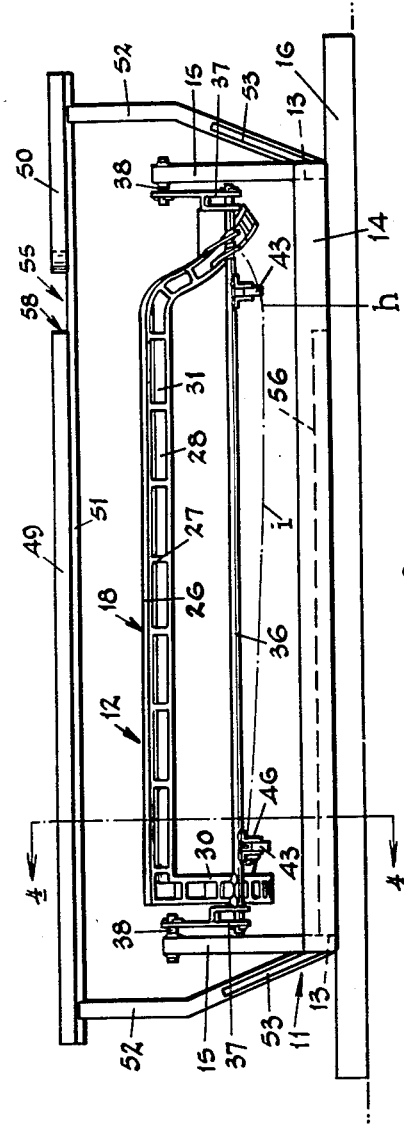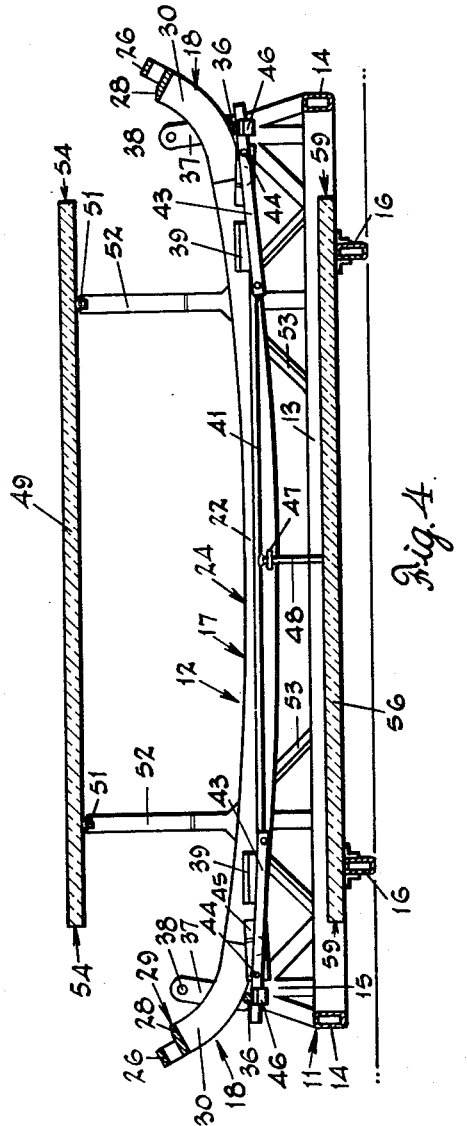

June 1, 1965  F. J. CARSON ETAL  3,186,821
APPARATUS FOR BENDING GLASS SHEETS
Filed June 12, 1961  4 Sheets-Sheet 3

INVENTORS
Frank J. Carson and
BY Herbert A. Leflet, Jr.
Nobbe & Swope
ATTORNEYS

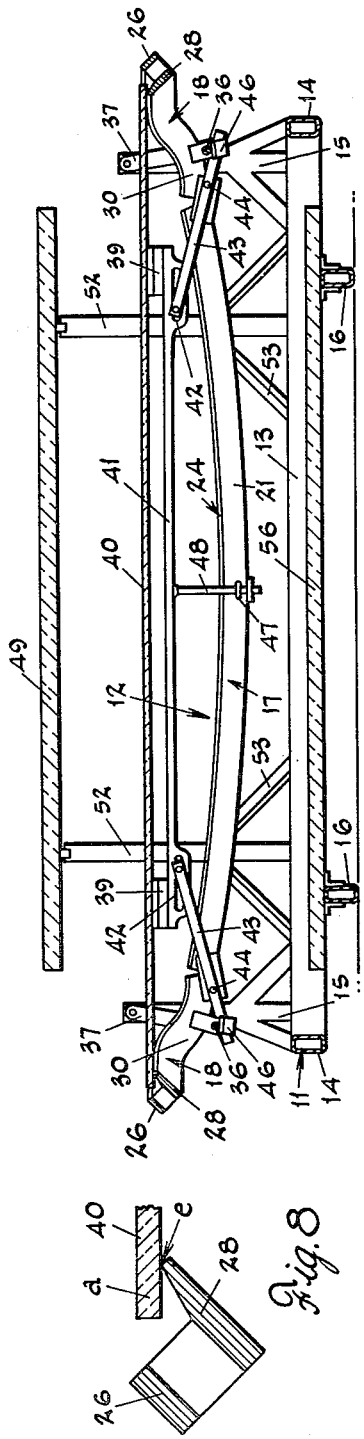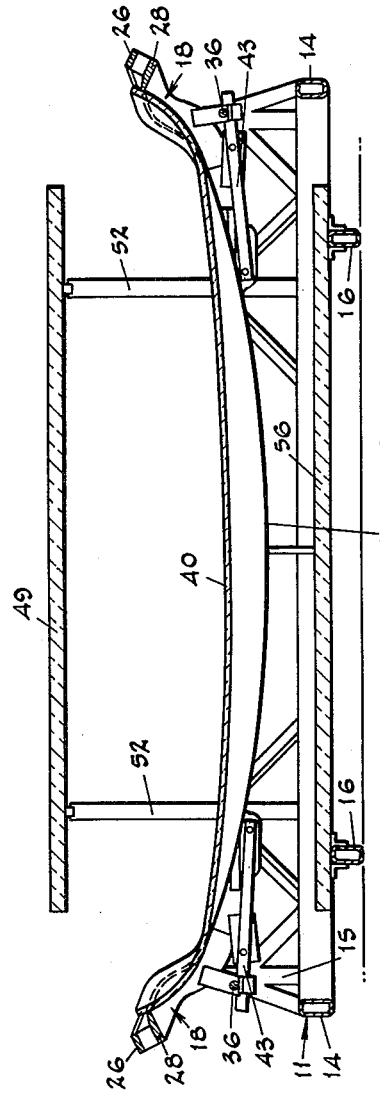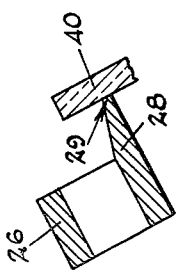

United States Patent Office 3,186,821
Patented June 1, 1965

3,186,821
APPARATUS FOR BENDING GLASS SHEETS
Frank J. Carson and Herbert A. Leflet, Jr., Toledo, Ohio, assignors to Libbey-Owens-Ford Glass Company, Toledo, Ohio, a corporation of Ohio
Filed June 12, 1961, Ser. No. 116,463
10 Claims. (Cl. 65—288)

This invention is related generally to the bending of glass sheets or plates, and more particularly to an improved apparatus for bending glass sheets to complex curvatures.

This application is a continuation-in-part of copending application Serial No. 704,494, filed December 23, 1957, now abandoned, which in turn is a division of application Serial No. 527,725, filed August 11, 1955, now abandoned.

Although not restricted thereto, the apparatus of the invention has proved especially useful in bending glass sheets to be used as transparent roof panels in automobiles. The bending of such a glass panel presents a considerably different problem as compared with the bending of automobile windshields and back windows. In bending the ordinary windshield, the glass essentially is bent in only one direction; that is, the central portion of the sheet remains relatively flat and the end portions are bent in a comparatively sharper curve. On the other hand, in bending a glass sheet to be used as a roof panel for an automobile, it is desirable that the side portions of said panel bend downwardly to meet the automobile framework and be curved slightly in plan along their length, and that the front portion or leading edge also bend downwardly and additionally in plan to blend in with the windshield. However, the remaining rear edge of the panel is not normally bent downwardly and has its edge disposed in a substantially vertical plane so that it may properly match the steel roof of the automobile. With such a complicated bend, the methods and bending molds of the usual type such as those used in bending windshields and back windows are not adequate to properly contour the three sides of the glass sheet requiring bends while at the same time providing an unbent portion of the remaining side which corresponds to and meets the automobile roof.

Therefore, an important object of the present invention is to provide an improved apparatus for bending glass sheets to complex curvatures.

Another object of the invention is to provide an apparatus for bending an edge of a glass sheet and at the same time impart a curvature to said edge.

Another object of the invention is to provide an apparatus for bending a substantially rectangular glass sheet along three of its four edges.

A further object of the invention is to provide an improved bending mold for bending a glass sheet to a complex curvature and means associated with said mold adapted to control the heating of selected portions of a glass sheet mounted on said mold.

Other objects and advantages of the invention will become more apparent during the course of the following description when taken in connection with the accompanying drawings.

In the drawings wherein like numerals are employed to designate like parts throughout the same:

FIG. 3 is a side elevation of the mold shown in FIG. 2;

FIG. 4 is a longitudinal vertical section taken along the line 4—4 of FIG. 3;

FIG. 7 is a longitudinal vertical section taken along the line 7—7 of FIG. 5;

FIG. 8 is an enlarged, fragmentary, detailed view of the mold end rail as viewed in FIG. 7;

FIG. 9 is a longitudinal vertical section similar to FIG. 7 but showing the shaping rail of the mold end section and the position of the glass sheet relative thereto when the mold is in the closed position; and FIG. 10 is an enlarged, fragmentary, detailed view of the mold end rail as viewed in FIG. 9.

Figures 1, 2:
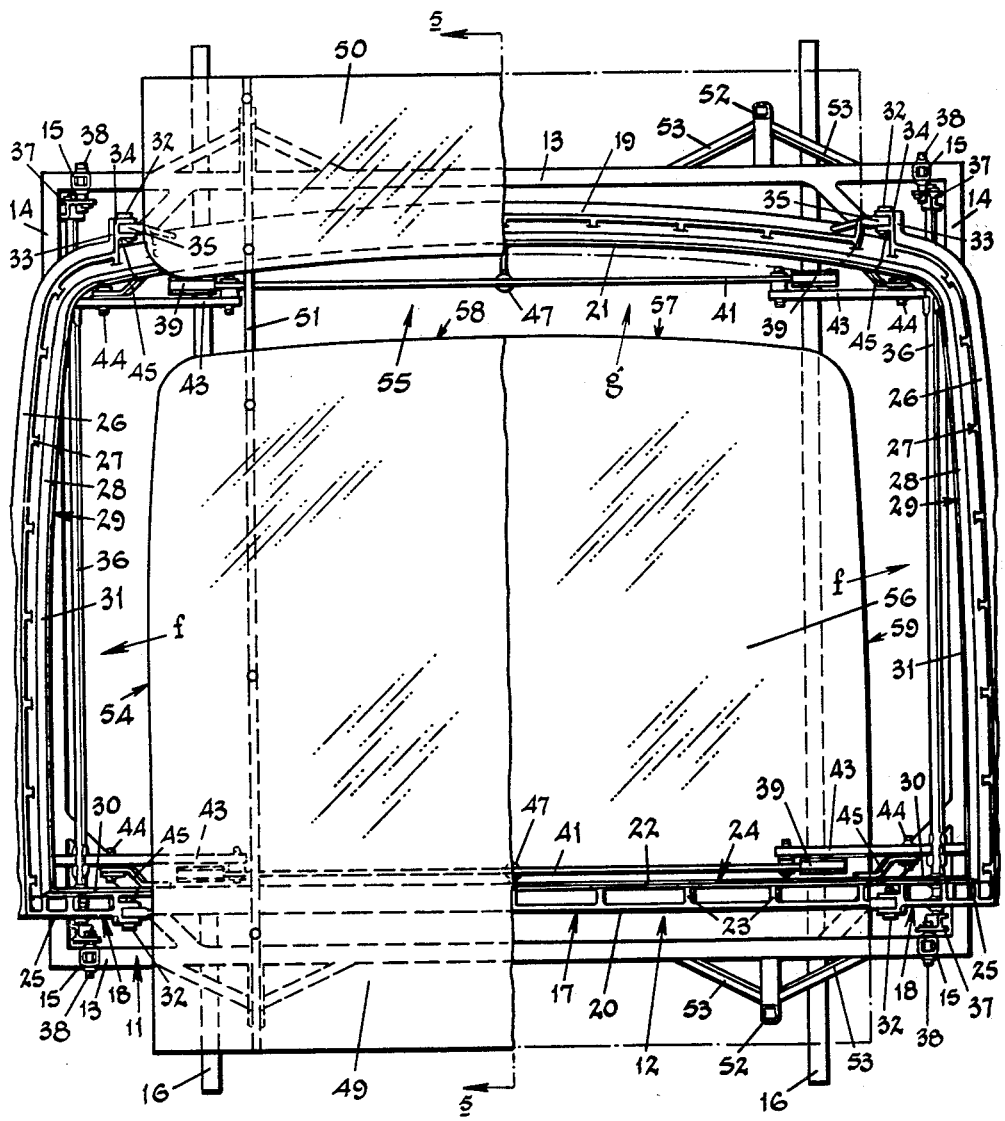
FIG. 1 is a perspective view of a bent glass sheet used as a roof panel.
FIG. 2 is a plan view of the improved hinged bending mold used to bend a glass sheet to the curvature shown in FIG. 1.

With reference now to the drawings, and particularly to FIG. 1, there is shown a roof panel 10 comprising a glass sheet which may be bent in accordance with the method and apparatus of the invention. The panel or sheet 10 is substantially rectangular in plan view and has symmetrical downwardly bent opposite side edges $a$ which are curved in plan along their lengths to converge and blend into a similar downwardly bent front or leading edge $b$ which is also curved in plan along its length. In its central portion $c$, the sheet is gently, convexly curved, such curvature being maintained in the rear edge $d$ of the sheet which is not bent downwardly as the front and side edges so that it blends into an automobile roof.

The improved bending apparatus built in accordance with the invention is shown in FIGS. 2 to 10 and comprises a supporting rack 11 and a hinged bending mold 12 supported upon the rack. The rack 11 is substantially rectangular in shape and comprises spaced, parallel side rails 13 rigidly connected to one another at their opposite ends by end rails 14. Spaced inwardly a limited distance from each of the opposite ends of the side rails 11 is a vertical upright 15 which, as later described, supports the bending mold 12 above the rack 11. As a means of guiding the rack through a bending furnace, a pair of spaced transverse guide rails 16 are secured to the lower surfaces of the side rails 13 and serve to engage flanges usually provided on the rolls of a conveyor used in the conventional type of glass bending furnace.

Figure 6:
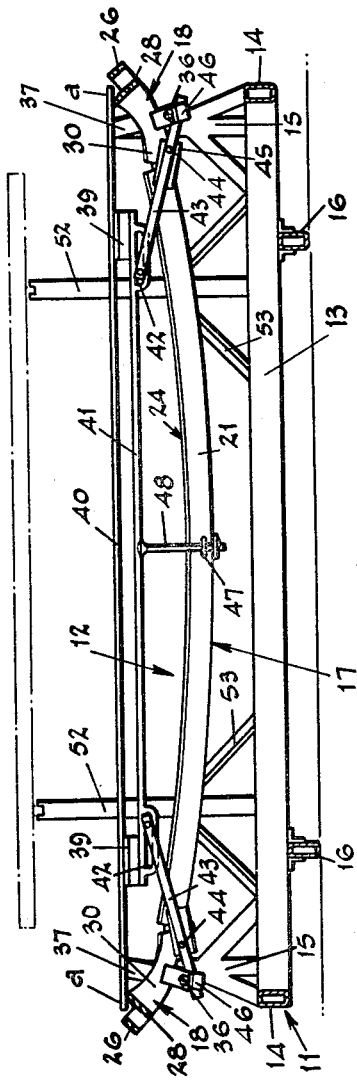
FIG. 6 is a longitudinal vertical section taken along the line 6—6 of FIG. 5.

The mold 12 is of the type commonly termed a hinged peripheral or outline mold and comprises a center section 17, and opposite end sections 18 hingedly joined to the center section for movement from an open to a closed position. As best seen in FIG. 2, the mold center section 17 comprises a pair of spaced side bars 19 and 20, each of which supports inwardly thereof a shaping rail 21 and 22 respectively, which are secured to their respective side bars by a plurality of web members 23 and have their upper surfaces finished to form a center section shaping surface 24. The rail 22, which corresponds to the edge $d$ of the roof panel 10, is substantially straight in plan view for its entire length. When viewed in a vertical plane, as shown in FIG. 4, the rail 22 is concavely curved having a relatively constant shallow curvature. The opposing rail portion 21, in plan view, is curved inwardly somewhat at its opposite ends to match the curvature of the leading edge $b$, and in a vertical plane, as seen in FIG. 6, is also of relatively shallow concave curvature.

Each of the mold end sections 18 is substantially identical in shape and comprises a straight side bar 25, aligned with the side bar 20 of the mold center section, which terminates at its outermost end at a curved end bar 26. The bar 26 is substantially straight at its end which joins the bar 25 and, as seen in FIG. 2, is curved inwardly at its opposite end and terminates adjacent the side bar 19 of the mold center section.

Carried within the confines of the end section bars 25 and 26 and rigidly secured thereto by means of additional web members 27 is a curved, generally U-shaped shaping rail 28 having its upper edge finished to form a curved shaping surface 29. As shown in FIG. 2, the rail 28 comprises a first or base portion 30 disposed in aligned relationship with the center section rail 22, and a second rail portion 31 joined to the outer end of the first rail portion 30 and which describes a gradual inwardly directed curve through the major portion of its length and terminates at its opposite end in a relatively sharp curve to meet in alignment with the rail 21 of the mold center section.

Now, as shown in FIGS. 5 to 8, when the mold is in the open position the outer corner $e$ of the upper edge of the end section shaping rail 28 is disposed in a substantially horizontal plane for a major portion of its length and at its inwardly curved end dips downwardly to meet in aligned conformity with the adjacent end of the center section rail 21. This is one extremely important aspect of the present invention as will be more fully explained hereinafter.

To movably join the mold end sections 18 to the center section 17, the inner end of each of the end section side bar portions 25 is bifurcated to receive the adjacent end of the center section side bar 20 which is pivotally joined thereto by means of a suitable pivot pin 32. At its opposite end, the side bar 26 of the mold end sections terminates in an outwardly directed web member 33 which has its outer end in the form of a yoke 34 to receive therewithin an outwardly extending bar portion 35 of the center section side bar 19 and is pivotally secured to said bar portion by a similar pivot pin 32.

The mold sections are supported for movement from an open to a closed position by a transverse rod 36 secured to the undersurface of each of the end section shaping rails and side bars. The opposite ends of the rod 36 extend outwardly from the end sections to be rotatably received in links 37 which have their upper ends pivotally secured to the rack uprights 15 by suitable pins 38.

To support a glass sheet both prior to and during the bending thereof, a plurality of support blocks 39 are provided which initially support a flat glass sheet 40 above the shaping surface of the center section of the mold, and at an advanced stage in the bending process lower the sheet into conformity with said shaping surface when the sheet is properly softened by heat so as to accurately conform thereto.

The blocks 39, which may be composed of suitable material which will not mar hot glass, are carried immediately inwardly of the center section rail portions 21 and 22 and are supported two each upon a pair of longitudinal rods 41. As seen in FIG. 6, a block 39 is carried at each of the opposite ends of the rod 41, which ends immediately beneath the blocks are formed in an oblong ring or slot 42. To support each end of the rod 41 for movement in a vertical plane, a linkage arrangement is used which includes an actuating lever 43 having a transverse portion thereof slidably received within the slot 42. The opposite free end of the lever 43 is disposed beneath the transverse support rod 36 of the mold end sections and slidably bears against the undersurface thereof which, in effect, acts as an anchor point. Intermediate its ends and adjacent the free end thereof, the lever 43 is pivotally supported by a pin 44 which is fixedly received in one end of a rigid bent plate 45 which has its opposite end secured to the adjacent shaping rail 21 or 22 adjacent one of the ends thereof. To provide a guide for the free end of the lever 43 and prevent transverse movement thereof, a pair of spaced angles 46 are secured to the undersurface of the transverse rods 36 and transversely spaced from one another a sufficient distance to receive the lever end therebetween.

Each of the rods 41 is stabilized during its vertical movement by means of rings 47 which are secured to the center section rail portions and which receive for movement therewithin a depending rod 48 fixedly secured to the rod 41 at its midpoint.

To influence the bending of the glass sheet 40 by retarding the heating of selected portions thereof, a plurality of heat deflectors or shields are provided associated with and carried by the mold for shielding from radiant heat sources commonly used in bending furnace, those portions of the sheet not required to be bent to relatively sharp curvatures. As an auxiliary function which may, in fact, be more important than their primary function of shading selected portions of the glass sheet from radiant heat, certain of the shields withdraw heat from the atmosphere adjacent the shaded portions of the sheet and further retard the heating of said shaded portions. The shields include a pair of upper shields 49 and 50 disposed above the mold, and preferably formed of Marinite (registered trademark) or other suitable material having a higher specific heat than glass. A pair of spaced transverse rods 51 (FIG. 2) support the shields 49 and 50 and are removably carried intermediate their ends by vertical struts 52 which have their lower ends secured to the rack side bars 13. To stabilize each of the struts, a pair of diagonal members 53 extend downwardly therefrom and terminate at the side bars 13.

Figure 5:
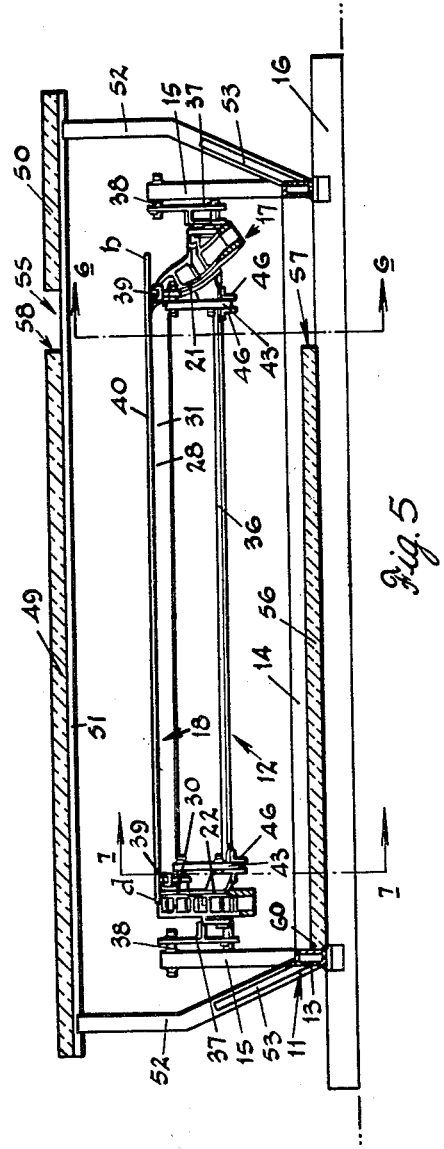
FIG. 5 is a transverse vertical section taken along the line 5—5 of FIG. 2 with the mold in the open position and having a flat glass sheet to be bent supported thereon.

As shown in FIGS. 2 and 5, the shield 49 is of such a width as to project its area downwardly to shade the central portion of the glass sheet 40 from a longitudinal line outwardly of the edge $d$ of said sheet to a second longitudinal line spaced inwardly of the leading edge $b$ of the sheet. In length, the shield 49 is of such a size as to have its end edges 54 terminate inwardly of each of the opposite side edges $a$ of the sheet 40, so as to leave a transverse marginal area $f$ on each side of the sheet, which extends inwardly of the side edges $a$ a limited distance, exposed to radiant heat.

The second upper shield 50, which is also supported by the transverse rods 51 and is substantially coextensive in length with the shield 49, shades the upper surface of the glass sheet 40 from the leading edge $b$ thereof inwardly to a longitudinal line spaced slightly inwardly of said sheet edge and of the shaping rail portion 21 which ultimately supports said edge. Thus, there is provided a gap 55 between the shields 49 and 50 which defines an unshaded area $g$ on the upper surface of the sheet 40 extending along the leading marginal edge thereof which joins, at its opposite ends, the transverse unshaded marginal areas $f$ inwardly of the transverse edges $a$ of the sheet. As viewed in FIG. 3, the center of the gap 55 between the upper shields 49 and 50 lies approximately in the same vertical plane as the point of maximum curvature $h$ of the bent sheet 40 which is defined by the phantom lines $i$, thus allowing the radiant heat passing through said gap to strike the glass sheet at a desired point of maximum curvature. By thus arranging the upper shields, radiant heat from above the path of travel of the mold through a bending furnace is only allowed to fall on those portions of the glass sheet 40 which are required to be subjected to relatively sharp bends and which are defined by the areas $f$ and $g$.

The lower surface of the sheet 40 is shaded over substantially the same central portion as that provided by the upper shield 49 by means of a lower shield 56. Similarly to the upper shields 49 and 50, the lower shield 56 is preferably composed of Marinite or other suitable insulating material having a higher specific heat than glass.

The shield 56 is supported on the rack guide rails 16 and has its inner longitudinal edge 57 disposed in substantially the same vetrical palne as the inner longitudinal edge 58 of the shield 49 and has its side edges 59 disposed in substantially the same vertical plane as the side edges 54 of the shield 49. For purposes of practical construction, the outer longitudinal edge 60 of the shield 56

(FIG. 5) terminates adjacent the rack side bar 13 but outwardly of the rear edge d of the glass sheet.

Due to the combined action of the upper and lower shields, as will be later described, radiant heat directed both downwardly and upwardly at the path of movement of the mold through a bending furnace strikes only the marginal portions f and g of the glass sheet supported on said mold, and the portion of the sheet inwardly of the areas f and g has the heat thereof retarded by the action of the shields which shade areas from radiant heat and, at the same time, withdraw heat from the atmosphere adjacent said shaded portion.

In bending glass sheets, according to the apparatus of the invention, the mold is first moved to the open position of FIG. 6 and the links 37 accommodate the movement by pivoting upon the support pins 38. In so opening the mold, the pins 44 which connect the lever arms 43 to the center section rail portions exert an uplift force upon the levers which, due to the end restraint by the transverse rods 36, causes the upper ends of said levers to move upwardly thus carrying the rods 41 having the support blocks 39 attached thereto in an upward direction to a point wherein the upper surfaces of the blocks 39 lie in substantially the same horizontal plane as opposed points along the end section shaping rails 28.

As previously mentioned, when the mold is in the open position of FIGS. 5 to 8, the outer edges e of the end rails 28 lie in a substantially horizontal plane from the first or base portion 30 of the rails 28 to those portions thereof wherein they dip downwardly to meet in aligned conformity with the adjacent ends of the center section rail 21. Therefore, when the glass sheet 40 is positioned upon the mold in its open position, the sheet is supported along substantially the entire lengths of both of its opposite end edges, which correspond to the edges a in FIG. 1, by the end rails 28, and intermediate its ends by the support blocks 39. Due to the weight of the glass sheet and its rigid character, the mold sections are retained in the open position of FIG. 6. The mold having the glass sheet thus supported is then passed into and through a bending furnace wherein it is subjected to zones of increasingly high temperature. These furnace zones commonly contain sources of radiant heat which direct radiant heat toward the path of the mold through the furnace and at the same time the furnace atmosphere to elevated temperatures.

Due to the action of the upper and lower shields, only the marginal portions f and g of the glass sheet are exposed to radiant heat directed either downwardly or upwardly toward the path of movement thereof through the bending furnace. Thus, the glass sheet, when in the unbent stage and when suported above the mold shaping surface, has the central portion thereof heated only by the furnace atmosphere while the unshaded portions f and g receive additional heat due to their exposure to radiant heat in the initial or prebend zone of the furnace wherein the sheet during its passage therethrough is gradually brought to bending temperature. At the same time, the heating of the shaded portions of the sheet is additionally retarded by withdrawing heat from the furnace atmosphere adjacent said portions due to the heat-withdrawing action of the upper and lower shields which absorb heat at a slower rate than the glass sheet and thus remain relatively cooler.

After being brought to bending temperature in a bending furnace, the mold having the glass sheet to be bent supported thereon then passes into what is commonly termed the bending zone of the furnace which is maintained at a temperature sufficient to cause the glass sheet to sag downwardly into conformity with the shaping surface of the mold. In the furnace bending zone, the marginal portions f and g of the glass sheet receive the additional heat, due to their exposure to radiation, which is required to enable them to conform to their relatively sharp final curvatures.

As the glass sheet softens and begins to sag downwardly, its restraining action on the mold end sections is decreased and said end sections rotating about the support links 37 have their upper ends describing an upward movement and at the same time their lower ends move downwardly carrying the mold center section therewith. As the center section moves downwardly, the uplift action exerted upon the levers 43, when the mold is in the open position, is reversed to a downward force and the blocks 39 move downwardly, lowering the glass sheet therewith in synchronous relation with the upward movement of the ends of the mold end sections and the downward movement of the mold center section. When the mold has completed its closing action and is in the position shown in FIGS. 4, 9 and 10, the blocks 39 are retracted to a position beneath the upper edge of the center section shaping rails which define the shaping surface thereof and the glass sheet is supported along the entire length and width of the mold shaping surface. In this respect, the marginal portions of the glass sheet 40 immediately adjacent and in contact with the end rails 28 are disposed at approximately right angles to the shaping surface 29 of the end rails 28.

It will be readily understood by those skilled in the art, that the conventional way of supporting the edges of glass sheets during the bending thereof oftentimes causes objectionable "edge corner curl" in the bent sheets due to the weight of the sheet resting on the corners thereof during bending. This is particularly the case when a glass sheet has the edges thereof curved as well as bent, for example, the edges a of the panel 10 shown in FIG. 1. To produce a true and accurate bend, according to the apparatus of the invention, the end rails 28 are mounted so as to support the opposite edges of the glass sheet during the entire closing action of the mold, with the actual supporting surface of the end rails varying or changing from the outer edges thereof to the shaping surface proper of the rails 28 during the bending of the sheet.

As the mold begins its closing movement from the position of FIG. 7 to the position shown in FIG. 9, the opposite edges of the glass sheet 40, which are initially supported for substantially their entire length on the outer edges e of the end rails 28 wherein the rigid sheet is supported linearly in a horizontal plane, have the linear support therefor transformed to an arcuate support reflecting the plan curvature of the rails 28, i.e. the softened glass sheet then "sees" and assumes the shape of the plan curvature of the end rails without at any time being unsupported. This change in the portion of the shaping surface of the end rails which is presented to the marginal end portions of the glass sheet while the end rails are rotating upwardly deflects the edge of the sheet intermediate the ends thereof while continuously supporting the deflected portion, thus avoiding weight concentrations on the edge corners of the sheet which cause "edge curl."

As the mold continues its closing movement, the upward and inward rotative movement of the rails 28, in combination with the rotation of the ends of the glass sheet, brings the full extent of shaping surface 29 of the rails into contact with the rotating sheet edge as the edge corner e of the rail moves out of bearing position. The final closing action of the mold rotates the end rails 28 into the position shown most clearly in FIGS. 2, 9 and 10.

To obtain the final cross section curvature of the glass sheet as shown by the phantom line i in FIG. 3, it is necessary to retain the mold within the bending furnace an additional time interval to permit radiant heat, passing through the shield gap 55 to heat the sheet area g to a higher temperature than the shaded portions of the sheet. While the area g is thus exposed to the additional heat necessary to form the point of maximum curvature h, the lower shield 56 continues to withdraw heat from the furnace atmosphere adjacent the lower surface of the glass sheet, and since the shield 56 has a higher specific heat than the glass, it acts to retard the heating of the central portion of the glass sheet adjacent thereto. The upper shields 49 and 50 also have a heat retarding action in addition to their shielding effect on the glass sheet, but due to their relatively greater distance, as compared to the lower shield from the sheet surface, the heat retarding action is less effective. However, the surfaces of both the upper and lower shields adjacent the glass sheet are at a lower temperature than the glass and, therefore, both will absorb radiant heat emitted by the glass sheet thus tending to have a further heat retarding action on the sheet, especially the shaded portions thereof.

It will be understood, of course, that the time of passage of the mold through the furnace is carefully controlled so that the glass sheet will not be over-exposed to heat. After being bent, the glass sheet may be cooled by passing it through a lehr if it is desired to anneal the sheet, or an air hood if it is desired to temper the same.

It is to be understood that the form of the invention herewith shown and described is to be taken as a preferred embodiment of the same, and that various changes in the shape, size and arrangement of parts may be resorted to without departing from the spirit of the invention.

We claim:

1. Apparatus for bending glass sheets to complex curvatures, comprising a generally rectangular, peripheral-type mold including a center section and a pair of end sections movably joined to the opposite ends of said center section, said sections being movable from an open position in which a flat glass sheet is supported on said end sections to a closed position in which the bent sheet is received on all said sections, said center section including a pair of spaced, opposed shaping rails, one of which defines a substantially straight line in plan and is curved in elevation while the other is bowed outwardly in plan and is also curved in elevation, each of said end sections also including a shaping rail, said end section shaping rails being generally U-shaped in plan with the uppermost surfaces thereof along the major portion of the rail length lying in a substantially horizontal plane when said mold sections are in the open position.

2. Apparatus according to claim 1, in which said center section shaping rails are concavely curved in elevation.

3. Apparatus according to claim 1, in which said end section rails are inclined upwardly and inwardly at an angle to the horizontal.

4. Apparatus according to claim 1, in which said end section shaping rails include portions at each of their ends which dip downwardly to meet in aligned conformity with the adjacent ends of said center section shaping rails when the mold sections are in said closed position.

5. Apparatus according to claim 1, in which said end section shaping rails include first portions at one of their opposed ends which dip downwardly to meet in alignment with the adjacent ends of said center section shaping rail which is curved in plan, and second portions at their other opposed ends which dip downwardly to meet in alignment with the adjacent ends of said center section shaping rail which defines a substantially straight line in plan, the portion of each end section shaping rail intermediate said first and second portions thereof describing a gradual inwardly directed curve from said second portion to said first portion.

6. Apparatus according to claim 5, in which said first portions of said end section shaping rails are additionally relatively sharply curved in plan.

7. Apparatus according to claim 5, in which said second portions of said end section shaping rails are disposed substantially at right angles to said intermediate portions thereof.

8. Apparatus according to claim 1, in which first and second heat shields are carried by and disposed above said mold, said first heat shield being positioned to extend in width from a point outwardly of said center section shaping rail which defines a substantially straight line in plan to a point inwardly of said center section shaping rail which is bowed outwardly in plan, and in length terminates inwardly of said end section shaping rails, said second heat shield being coextensive in length with said first shield but spaced therefrom, and extending in width from said center section shaping rail curved in plan to a point outwardly thereof.

9. Apparatus according to claim 8, in which a third heat shield is carried by and disposed below said mold, said third heat shield being positioned substantially directly below said first heat shield.

10. Apparatus for bending glass sheets to complex curvatures comprising a generally rectangular, peripheral-type mold including a center section and a pair of end sections movably joined to the opposite ends of said center section, said sections being movable from an open position in which a flat glass sheet is supported on said end sections to a closed position in which the bent sheet is received on all said sections, said center section including a pair of spaced, opposed shaping rails, one of which defines a substantially straight line in plan and is curved in elevation while the other is bowed outwardly in plan and is also curved in elevation, each of said end sections also including a shaping rail at least the upper surfaces of which are curved in plan to define shaping surfaces contoured to the desired bent curvature of two opposed marginal portions of the glass sheet, each of said end section shaping surfaces having a glass supporting outer edge contiguous therewith so as to follow the contour of the shaping surface, and means mounting said end shaping rails so that the major portion of the length of said edges lie in a substantially horizontal plane parallel to the plane of the flat glass sheet and are in continuous linear contact with the flat glass sheet resting thereon when the mold is in the open position, with said end section shaping surfaces including said major portion of said edges remaining in contact with said opposed marginal portions of the sheet during the complete movement of the mold sections from said open to said closed position.

References Cited by the Examiner
UNITED STATES PATENTS

| | | | |
|---|---|---|---|
| 2,348,278 | 5/44 | Boyles et al. | 65—288 |
| 2,551,606 | 5/51 | Jendrisak | 65—107 |
| 2,608,030 | 8/52 | Jendrisak | 65—287 |
| 2,646,647 | 7/53 | Bamford et al. | 65—107 X |
| 2,688,210 | 9/54 | Jendrisak | 65—287 |
| 2,872,756 | 2/59 | Jendrisak | 65—290 |
| 2,920,423 | 1/60 | Carson et al. | 65—290 |
| 2,925,688 | 2/60 | Carson | 65—290 |

DONALL H. SYLVESTER, Primary Examiner.

MORRIS O. WOLK, Examiner.